(12) United States Patent
Sobolev et al.

(10) Patent No.: US 11,550,682 B2
(45) Date of Patent: Jan. 10, 2023

(54) SYNTHETIC SYSTEM FAULT GENERATION

(71) Applicant: International Business Machines Corporation, Armonk, NY (US)

(72) Inventors: Boris Sobolev, Berkeley, CA (US); Larisa Shwartz, Greenwich, CT (US); Ajay Gupta, New Delhi (IN); Qing Wang, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 17/075,088

(22) Filed: Oct. 20, 2020

(65) Prior Publication Data

US 2022/0121540 A1    Apr. 21, 2022

(51) Int. Cl.
| | |
|---|---|
| *G06F 11/00* | (2006.01) |
| *G06F 11/22* | (2006.01) |
| *G06N 5/02* | (2006.01) |
| *G06N 3/08* | (2006.01) |
| *G06N 3/04* | (2006.01) |
| *G06F 11/34* | (2006.01) |

(52) U.S. Cl.
CPC ...... *G06F 11/2263* (2013.01); *G06F 11/3457* (2013.01); *G06N 3/0454* (2013.01); *G06N 3/08* (2013.01); *G06N 5/022* (2013.01)

(58) Field of Classification Search
CPC .......................... G06F 11/2263; G06F 11/3457
USPC ...................................................... 714/1–57
See application file for complete search history.

(56) References Cited

U.S. PATENT DOCUMENTS 5,572,597 A  * 11/1996 Chang .................. G06K 9/6226
                                                         382/125
6,405,184 B1   6/2002 Bohme et al.
(Continued)

FOREIGN PATENT DOCUMENTS

| CN | 110414604 | 11/2019 |
|---|---|---|
| CN | 111176263 | 5/2020 |
| KR | 100439674 | 7/2004 |

OTHER PUBLICATIONS

Mell et al., "The NIST Definition of Cloud Computing," Recommendations of the National Institute of Standards and Technology, NIST Special Publication 800-145, Sep. 2011, 7 pages.

Xu et al., "Modeling Tabular data using Conditional GAN," 33rd Conference on Neural Information Processing Systems, arXiv:1907.00503 [cs.LG], Oct. 28, 2019, 15 pages.

(Continued)

*Primary Examiner* — Sarai E Butler
(74) *Attorney, Agent, or Firm* — Amin, Turocy & Watson, LLP

(57) ABSTRACT

Systems, computer-implemented methods, and computer program products that facilitate synthetic system fault generation are provided. According to an embodiment, a system can comprise a processor that executes the following computer-executable components stored in a non-transitory computer readable medium: a generator component that employs a trained artificial intelligence (AI) model to generate a synthetic system fault, represented as a combination of discrete parameters and continuous parameters that define a system state; and a fault assembler component that analyzes the synthetic system fault and generates textual content corresponding to the synthetic system fault.

20 Claims, 10 Drawing Sheets

(56) References Cited

U.S. PATENT DOCUMENTS

| | | | |
|---|---|---|---|
| 6,944,586 B1* | 9/2005 | Harless | G06Q 90/00 |
| | | | 715/744 |
| 7,849,448 B2 | 12/2010 | Yunus et al. | |
| 8,589,736 B2 | 11/2013 | Pasupuleti et al. | |
| 9,529,699 B2 | 12/2016 | Rajan et al. | |
| 10,445,290 B1* | 10/2019 | Bunyan | G06F 3/04842 |
| 2012/0166363 A1 | 6/2012 | He et al. | |
| 2017/0024299 A1 | 1/2017 | Deng et al. | |
| 2018/0247227 A1* | 8/2018 | Holtham | G06N 3/0454 |
| 2020/0012725 A1* | 1/2020 | Li | G06V 20/41 |
| 2020/0104357 A1 | 4/2020 | Bellegarda et al. | |
| 2020/0218999 A1* | 7/2020 | Eleftheriadis | G06N 7/005 |
| 2021/0019621 A1* | 1/2021 | Bhattacharyya | G06K 9/6298 |
| 2021/0110205 A1* | 4/2021 | Karimi | G06V 30/32 |
| 2021/0374279 A1* | 12/2021 | Zheng | G06N 5/022 |

OTHER PUBLICATIONS

Examination Report received for G.B. Patent Application Serial No. GB2113985.2 dated May 27, 2022, 12 pages.

Li et al., "A Novel Method for Imbalanced Fault Diagnosis of Rotating Machinery based on Generative Adversarial Networks", IEEE Transactions on Instrumentation and Measurement, 2020, pp. 1-17, *Jul. 2020.

Shao et al., "Generative Adversarial Networks for Data Augmentation in Machine Fault Diagnosis", Computers in Industry, vol. 106, 2019, pp. 85-93.

Yu et al., "CWGAN: Conditional Wasserstein Generative Adversarial Nets for Fault Data Generation", Proceeding of the IEEE International Conference on Robotics and Biomimetics, Dec. 2019, pp. 2713-2718.

Reply dated Sep. 26, 2022 to Examination Report received for G.B. Patent Application Serial No. GB2113985.2 dated Jul. 26, 2022.

* cited by examiner

SYNTHETIC SYSTEM FAULT GENERATION

BACKGROUND

The subject disclosure relates to system faults, and more specifically, to synthetic system fault generation.

System fault data is very limited, due to the rarity of events. Many existing technologies that automatically detect system faults use machine learning (ML) and/or artificial intelligence (AI) methods. A problem with such existing technologies is that the amount of system fault data available for a particular system is often not enough to apply such ML and/or AI methods. Another problem with such existing technologies is that the quality of system fault data available for a particular system is often not sufficient enough to apply such ML and/or AI methods. In addition, information technology (IT) data is very complex, so generating an adequate amount of quality system fault data that can be used by such existing technologies is difficult.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate synthetic system fault generation are described.

According to an embodiment, a system can comprise a processor that executes the following computer-executable components stored in a non-transitory computer readable medium: a generator component that employs a trained artificial intelligence (AI) model to generate a synthetic system fault, represented as a combination of discrete parameters and continuous parameters that define a system state; and a fault assembler component that analyzes the synthetic system fault and generates textual content corresponding to the synthetic system fault. An advantage of such a system is that it can generate synthetic system faults that can be used to train one or more AI and/or ML models to detect one or more previously unknown and/or undetected system faults in a certain system.

In some embodiments, the computer-executable components further comprise an aggregator component that generates a knowledge base of generated synthetic system faults and respective textual data. An advantage of such a system is that it can generate the knowledge base, which can be used to train one or more AI and/or ML models to detect one or more previously unknown and/or undetected system faults in a certain system.

According to another embodiment, a computer-implemented method can comprise employing, using a processor, a trained artificial intelligence (AI) model to generate a synthetic system fault, represented as a combination of discrete parameters and continuous parameters that define a system state. The computer-implemented method can further comprise analyzing, using the processor, the synthetic system fault and generating textual content corresponding to the synthetic system fault. An advantage of such a computer-implemented method is that it can be implemented to generate synthetic system faults that can be used to train one or more AI and/or ML models to detect one or more previously unknown and/or undetected system faults in a certain system.

In some embodiments, the above computer-implemented method can further comprise generating, using the processor, a knowledge base of generated synthetic system faults and respective textual data. An advantage of such a computer-implemented method is that it can be implemented to generate the knowledge base, which can be used to train one or more AI and/or ML models to detect one or more previously unknown and/or undetected system faults in a certain system.

According to another embodiment, a computer program product comprising a computer readable storage medium having program instructions embodied therewith, the program instructions executable by a processor to cause the processor to employ a trained artificial intelligence (AI) model to generate a synthetic system fault, represented as a combination of discrete parameters and continuous parameters that define a system state. The program instructions are further executable by the processor to cause the processor to analyze the synthetic system fault and generate textual content corresponding to the synthetic system fault. An advantage of such a computer program product is that it can be implemented to generate synthetic system faults that can be used to train one or more AI and/or ML models to detect one or more previously unknown and/or undetected system faults in a certain system.

In some embodiments, the program instructions are further executable by the processor to cause the processor to generate a knowledge base of generated synthetic system faults and respective textual data. An advantage of such a computer program product is that it can be implemented to generate the knowledge base, which can be used to train one or more AI and/or ML models to detect one or more previously unknown and/or undetected system faults in a certain system.

DETAILED DESCRIPTION

Figure 1:
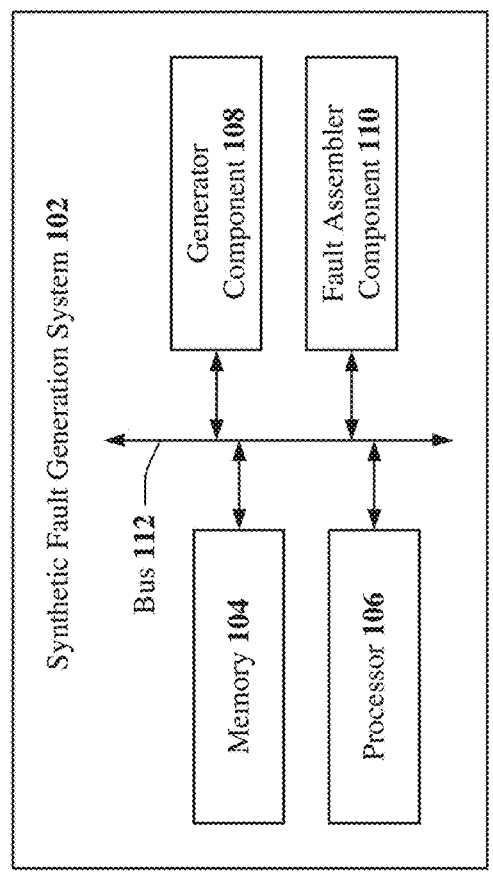
FIGS. 1 and 2 illustrate block diagrams of example, non-limiting systems that can facilitate synthetic system fault generation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems described above with existing technologies that automatically detect system faults, the present disclosure can be implemented to produce a solution to these problems in the form of systems, computer-implemented methods, and/or computer program products that can facilitate synthetic system fault generation by: employing a trained artificial intelligence (AI) model to generate a synthetic system fault, represented as a combination of discrete parameters and continuous parameters that define a system state; analyzing the synthetic system fault; and/or generating textual content corresponding to the synthetic system fault. An advantage of such systems, computer-implemented methods, and/or computer program products is that they can be implemented to generate synthetic system faults that can be used to train one or more AI and/or ML models to detect one or more previously unknown and/or undetected system faults in a certain system.

In some embodiments, the present disclosure can be implemented to produce a solution to the problems described above in the form of systems, computer-implemented methods, and/or computer program products that can generate a knowledge base of generated synthetic system faults and respective textual data. An advantage of such systems, computer-implemented methods, and/or computer program products is that they can be implemented to generate the knowledge base, which can be used to train one or more AI and/or ML models to detect one or more previously unknown and/or undetected system faults in a certain system.

As referenced herein, a "fault" or a "system fault" can describe a malfunction and/or a failure of one or more components in a system such as, for example, a software system and/or a hardware system (e.g., a classical computing software system and/or hardware system, a quantum computing software system and/or hardware system, etc.). As referenced herein, such a "fault" or such a "system fault" can be represented as a combination of discrete parameters and continuous parameters that define a state of such a system, as well as textual data corresponding to and/or describing the "fault" or the "system fault" (e.g., logs generated by the system that comprise a textual description of a "fault" or a "system fault"). As referenced herein, such discrete parameters and/or continuous parameters can comprise, for instance, central processing unit (CPU) parameters, infrastructure parameters, memory parameters, and/or another parameter of a software system and/or a hardware system.

As referenced herein, an "entity" can comprise a human, a client, a user, a computing device, a software application, an agent, a machine learning (ML) model, an artificial intelligence (AI) model, and/or another entity. In accordance with one or more embodiments of the subject disclosure described herein, such an entity can implement synthetic fault generation system 102 and/or one or more components thereof (e.g., generator component 108, fault assembler component 110, model trainer component 202, aggregator component 204, etc.).

FIG. 1 illustrates a block diagram of an example, non-limiting system 100 that can facilitate synthetic system fault generation in accordance with one or more embodiments described herein. System 100 can comprise a synthetic fault generation system 102. Synthetic fault generation system 102 can comprise a memory 104, a processor 106, a generator component 108, a fault assembler component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or synthetic fault generation system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to synthetic fault generation system 102, generator component 108, fault assembler component 110, and/or another component associated with synthetic fault generation system 102 (e.g., model trainer component 202, aggregator component 204, etc.) as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Synthetic fault generation system 102, memory 104, processor 106, generator component 108, fault assembler component 110, and/or another component of synthetic fault generation system 102 as described herein (e.g., model trainer component 202, aggregator component 204, etc.) can be communicatively, electrically, operatively, and/or optically coupled to one another via a bus 112 to perform functions of system 100, synthetic fault generation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Synthetic fault generation system 102 can comprise any type of component, machine, device, facility, apparatus, and/or instrument that comprises a processor and/or can be capable of effective and/or operative communication with a wired and/or wireless network. All such embodiments are envisioned. For example, synthetic fault generation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Synthetic fault generation system 102 can be coupled (e.g., communicatively, electrically, operatively, optically, etc.) to one or more external systems, sources, and/or devices (e.g., classical and/or quantum computing devices, communication devices, etc.) using a wire and/or a cable. For example, synthetic fault generation system 102 can be coupled (e.g., communicatively, electrically, operatively, optically, etc.) to one or more external systems, sources, and/or devices (e.g., classical and/or quantum computing devices, communication devices, etc.) using a data cable including, but not limited to, a High-Definition Multimedia Interface (HDMI) cable, a recommended standard (RS) 232 cable, an Ethernet cable, and/or another data cable.

In some embodiments, synthetic fault generation system 102 can be coupled (e.g., communicatively, electrically, operatively, optically, etc.) to one or more external systems, sources, and/or devices (e.g., classical and/or quantum computing devices, communication devices, etc.) via a network. For example, such a network can comprise wired and/or wireless networks, including, but not limited to, a cellular network, a wide area network (WAN) (e.g., the Internet) or a local area network (LAN). synthetic fault generation system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, synthetic fault generation system 102 can comprise hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that can facilitate communicating information between synthetic fault generation system 102 and external systems, sources, and/or devices (e.g., computing devices, communication devices, etc.).

Synthetic fault generation system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with synthetic fault generation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, generator component 108, fault assembler component 110, and/or any other components associated with synthetic fault generation system 102 (e.g., model trainer component 202, aggregator component 204, etc.) as disclosed herein (e.g., communicatively, electronically, operatively, and/or optically coupled with and/or employed by synthetic fault generation system 102), can comprise such computer and/or machine readable, writable, and/or executable component(s) and/or instruction(s). Consequently, according to numerous embodiments, synthetic fault generation system 102 and/or any components associated therewith as disclosed herein, can employ processor 106 to execute such computer and/or machine readable, writable, and/or executable component(s) and/or instruction(s) to facilitate performance of one or more operations described herein with reference to synthetic fault generation system 102 and/or any such components associated therewith.

Synthetic fault generation system 102 can facilitate (e.g., via processor 106) performance of operations executed by and/or associated with generator component 108, fault assembler component 110, and/or another component associated with synthetic fault generation system 102 as disclosed herein (e.g., model trainer component 202, aggregator component 204, etc.). For example, as described in detail below, synthetic fault generation system 102 can facilitate (e.g., via processor 106): employing a trained artificial intelligence (AI) model to generate a synthetic system fault, represented as a combination of discrete parameters and continuous parameters that define a system state; and/or analyzing the synthetic system fault and generating textual content corresponding to the synthetic system fault.

In another example, as described in detail below, synthetic fault generation system 102 can further facilitate (e.g., via processor 106): preprocessing historical system data that can comprise at least one of historical discrete parameters or historical continuous parameters, where the historical discrete parameters are represented as one-hot encoded vectors, and for the historical continuous parameters mode-specific normalization with Variational Gaussian Mixture Model is employed; training the AI model using a generative adversarial network architecture; training the AI model using a conditional tabular adversarial network; training the AI model with Wasserstein Gradient Penalty Loss (WGAN-GP Loss); restoring complex multimodal distributions of a subset of at least one of the discrete parameters or the continuous parameters conditioned to a row of an associated dataset; and/or generating a knowledge base of generated synthetic system faults and respective textual data. In the above examples, the textual content can comprise at least one of a system log or a description of the synthetic system fault.

Generator component 108 can employ a trained artificial intelligence (AI) model to generate a synthetic system fault, represented as a combination of discrete parameters and continuous parameters that define a system state. For example, generator component 108 can employ a trained generative adversarial network architecture such as, for instance, a trained generative adversarial network (GAN) to generate a synthetic system fault, represented as a combination of discrete parameters and continuous parameters that together define a system state. In another example, generator component 108 can employ a trained conditional tabular adversarial network such as, for instance, a trained conditional tabular generative adversarial network (CTGAN) to generate a synthetic system fault, represented as a combination of discrete parameters and continuous parameters that together define a system state. In the above examples, such an AI model that can be employed by generator component 108 to generate such a synthetic system fault can be trained by model trainer component 202 as described below with reference to the example embodiment illustrated in FIG. 2.

Generator component 108 can employ such a trained AI model (e.g., a trained CTGAN) to generate various synthetic system faults that can each comprise a certain combination of at least one discrete parameter and at least one continuous parameter that together define the state of a system (e.g., a classical computing software system and/or hardware system, a quantum computing software system and/or hardware system, etc.). In some embodiments, such at least one discrete parameter and/or such at least one continuous parameter can be elements and/or a subset of elements in a dataset associated with the system. For example, such at least one discrete and/or continuous parameters can be elements and/or a subset of elements positioned in the columns of such a dataset associated with the system and each row of the dataset can constitute a system fault represented as a combination of at least one of such discrete parameters and at least one of such continuous parameters. In some embodiments, such at least one discrete and/or continuous parameters can include, but are not limited to, central processing unit (CPU) parameters, infrastructure parameters, memory parameters, and/or another parameter of a system such as, for instance, a software system and/or a hardware system (e.g., a classical computing software system and/or hardware system, a quantum computing software system and/or hardware system, etc.).

Generator component 108 can restore complex multimodal distributions of a subset of at least one of discrete parameters or continuous parameters conditioned to a row of an associated dataset. For example, by employing such a trained AI model described above (e.g., a trained CTGAN) to generate a synthetic system fault comprising a certain combination of at least one discrete parameter and/or at least one continuous parameter that together define the state of a system, generator component 108 can restore complex multimodal distributions of such a combination of the at least one discrete parameter and/or the at least one continuous parameter conditioned to a row of the above described dataset that can be associated with the system.

Fault assembler component 110 can analyze a synthetic system fault and generate textual content corresponding to the synthetic system fault. For example, fault assembler component 110 can analyze the synthetic system fault that can be generated by generator component 108 as described above and fault assembler component 110 can further generate textual content corresponding to the synthetic system fault such as, for instance, a system log, a description of the synthetic system fault, and/or other textual content. In this example, such textual content corresponding to the synthetic system fault (e.g., a system log, a description of the synthetic system fault, etc.) can be formatted as a text file and/or another format that can be read by an entity as defined herein (e.g., a human, a client, a user, a computing device, a software application, an agent, an ML model, an AI model, etc.).

In some embodiments, synthetic fault generation system 102 can be associated with a cloud computing environment. For example, synthetic fault generation system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Synthetic fault generation system 102 and/or components thereof (e.g., generator component 108, fault assembler component 110, model trainer component 202, aggregator component 204, etc.) can employ one or more computing resources of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by synthetic fault generation system 102 and/or components thereof to execute one or more operations in accordance with one or more embodiments of the subject disclosure described herein. For instance, synthetic fault generation system 102 and/or components thereof can employ such one or more classical and/or quantum computing resources to execute one or more classical and/or quantum: mathematical function, calculation, and/or equation; computing and/or processing script; algorithm; model (e.g., AI model, ML model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
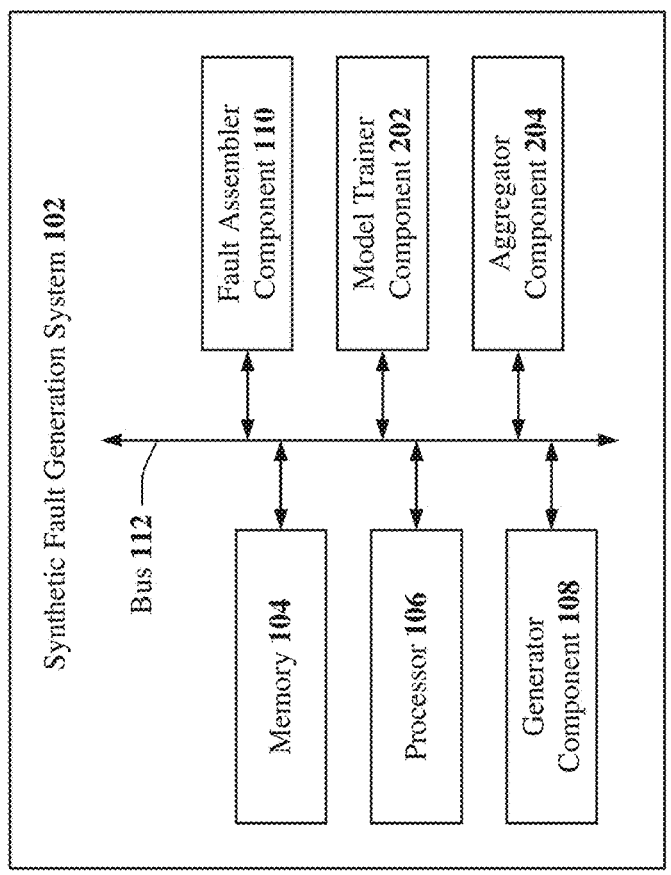

FIG. 2 illustrates a block diagram of an example, non-limiting system 200 that can facilitate synthetic system fault generation in accordance with one or more embodiments described herein. System 200 can comprise synthetic fault generation system 102, which can further comprise a model trainer component 202 and/or an aggregator component 204. Repetitive description of like elements and/or processes employed in respective embodiments is omitted for sake of brevity.

Model trainer component 202 can train an AI model using a generative adversarial network architecture. For example, model trainer component 202 can train the AI model that can be employed by generator component 108 to generate a synthetic system fault, represented as a combination of discrete parameters and continuous parameters that define a system state as described above with reference to the example embodiment illustrated in FIG. 1. For instance, model trainer component 202 can train a generative adversarial network (GAN) that can be employed by generator component 108 as described above with reference to FIG. 1, where model trainer component 202 can train such a GAN using a generative adversarial network architecture. In this example, such a GAN can comprise a conditional tabular generative adversarial network (CTGAN), where model trainer component 202 can train such a CTGAN using a generative adversarial network architecture. That is, in this example, model trainer component 202 can train a CTGAN using a generative adversarial network architecture where one element can define a system fault as a certain combination of at least one discrete parameter and at least one continuous parameter in a dataset and another element can analyze the defined system fault and provide a reason as to why the defined system fault does not represent a legitimate system fault (e.g., a logical system fault) and/or a meaningful system fault (e.g., a system fault that can actually occur), with respect to a certain system.

To train such a CTGAN as described above, model trainer component 202 can use historical system data as training data. For example, model trainer component 202 can train such a CTGAN as described above using historical system data corresponding to one or more systems and/or one or more authentic system faults that have occurred in such one or more systems. In some embodiments, such historical system data can be stored on a database such as, for instance, memory 104 and model trainer component 202 can employ processor 106 to obtain such historical system data.

In the example embodiment illustrated in FIG. 2, such historical system data can comprise historical system fault data. For example, such historical system data can comprise historical system fault data that can constitute, define, describe, and/or correspond to one or more authentic system faults that have occurred in a system. In this example, such historical system fault data can include, but is not limited to: various combinations of historical discrete parameters and historical continuous parameters that define the state of a system, where each combination constitutes an authentic system fault that has occurred in a system; historical textual data (e.g., historical system logs, historical descriptions of authentic system faults, etc.) corresponding to authentic system faults that have occurred in one or more systems; historical fault localization data corresponding to one or more systems; historical root cause data corresponding to one or more systems; historical work order requests corresponding to one or more systems; historical information technology (IT) tickets corresponding to one or more systems; and/or other historical data that can constitute, define, describe, and/or correspond to one or more actual system faults that have occurred in one or more systems.

To train such a CTGAN as described above using the above defined historical system fault data, model trainer component 202 can use processor 106 to preprocess such historical system fault data. For example, model trainer component 202 can use processor 106 to preprocess such historical system fault data defined above by representing historical discrete parameters as one-hot encoded vectors and using mode-specific normalization with Variational Gaussian Mixture Model to preprocess historical continuous parameters.

In the example embodiment illustrated in FIG. 2, based on preprocessing the above defined historical system fault data, model trainer component 202 can use the preprocessed historical system fault data to train a CTGAN as described above. For example, model trainer component 202 can use the preprocessed historical system fault data to train (e.g., via processor 106) a CTGAN to generate a synthetic system fault, represented as a combination of discrete parameters and continuous parameters that define a system state. In this example, model trainer component 202 can train (e.g., via processor 106) a CTGAN with a Wasserstein Gradient Penalty Loss (WGAN-GP Loss).

In some embodiments, model trainer component 202 can train such a CTGAN as described above, where the model architecture of such a CTGAN and a discriminator associated with such a CTGAN can be defined as follows.

Model Architecture $$\begin{cases} h_0 = z \oplus cond \\ h_1 = h_0 \oplus ReLU(BN(FC_{|cond|+|z|\to 256}(h_0))) \\ h_2 = h_1 \oplus ReLU(BN(FC_{|cond|+|z|+256\to 256}(h_1))) \\ \hat{\alpha}_i = \tanh(FC_{|cond|+|z|+512\to 1}(h_2)) & 1 \le i \le N_c \\ \hat{\beta}_i = gumbel_{0.2}(FC_{|cond|+|z|+512\to m_i}(h_2)) & 1 \le i \le N_c \\ \hat{d}_i = gumbel_{0.2}(FC_{|cond|+|z|+512\to |D_i|}(h_2)) & 1 \le i \le N_d \end{cases}$$

where: $h_i$ ($h_0$, $h_1$, and $h_2$) denotes hidden layers; $\alpha_i$ denotes the scalar value generated by tan h; $\beta_i$ denotes the mode indicator value generated by gumbel softmax; $d_i$ denotes the discrete value generated by gumbel softmax; cond denotes the vector indicating condition; ReLU denotes the activation function; BN denotes the batch normalization; and FC denotes the application of a linear transformation.

Discriminator Architecture $$\begin{cases} h_0 = r_1 \oplus \ldots \oplus r_{10} \oplus cond_1 \oplus \ldots \oplus cond_{10} \\ h_1 = drop\,(leaky_{0.2}(FC_{10|r|+10|cond|\to 256}(h_0))) \\ h_2 = drop\,(leaky_{0.2}(FC_{256\to 256}(h_1))) \\ C(\cdot) = FC_{256\to 1}(h_2) \end{cases}$$

where: $r_i$ ($r_1$, $r_{10}$, etc.) denotes row I; drop denotes the dropout of a hidden layer; and C denotes a critic with pac size 10.

In some embodiments, model trainer component 202 can train a CTGAN as illustrated by diagram 500 described below and depicted in FIG. 5.

Aggregator component 204 can generate a knowledge base (not illustrated in the figures) of generated synthetic system faults and respective textual data. For example, aggregator component 204 can generate a knowledge base (e.g., using a knowledge base builder application or software) of generated synthetic system faults that can be generated by generator component 108, where such a knowledge base can further comprise the respective textual data that can be generated by fault assembler component 110 and that correspond to each of such synthetic system faults. In an embodiment, aggregator component 204 can generate a knowledge base that can comprise various synthetic system faults that can be generated by generator component 108 as described above with reference to the example embodiment illustrated in FIG. 1, as well as the corresponding respective textual data that can be generated by fault assembler component 110 as described above with reference to FIG. 1. In another embodiment, aggregator component 204 can generate a knowledge base that can comprise such various synthetic system faults and corresponding respective textual data and/or one or more authentic system faults (e.g., system faults that have actually occurred and/or known system faults).

In some embodiments, aggregator component 204 can add one or more of such generated synthetic system faults and respective corresponding textual data to an existing knowledge base. For example, aggregator component 204 can add (e.g., using a knowledge base builder application or software) one or more of such generated synthetic system faults and respective corresponding textual data to a knowledge base that has been previously generated by aggregator component 204. In an embodiment, such an existing knowledge base can comprise various synthetic system faults that can be generated by generator component 108 as described above with reference to the example embodiment illustrated in FIG. 1, as well as the corresponding respective textual data that can be generated by fault assembler component 110 as described above with reference to FIG. 1. In another embodiment, the existing knowledge base can comprise such various synthetic system faults and corresponding respective textual data and/or one or more authentic system faults (e.g., system faults that have actually occurred and/or known system faults).

It should be appreciated that the above described knowledge base and/or existing knowledge base that can be generated by aggregator component 204 (e.g., using a knowledge base builder application or software) can be used to train one or more AI and/or ML models of an automated fault detection system to discover one or more system faults in a certain system. For example, in accordance with one or more embodiments of the subject disclosure, synthetic fault generation system 102 (e.g., via generator component 108 and fault assembler component 110) can generate a substantial number of synthetic system faults having adequate quality that can be used as training data to train such one or more AI and/or ML models to automatically discover one or more authentic system faults comprising the same attributes (e.g., discrete parameters, continuous parameters, etc.) and/or functionality as that of the synthetic system faults generated by synthetic fault generation system 102.

It should also be appreciated that the above described knowledge base and/or existing knowledge base that can be generated by aggregator component 204 (e.g., using a knowledge base builder application or software) can be used to discover one or more system faults in a certain system, where such one or more system faults can comprise the same attributes (e.g., discrete parameters, continuous parameters, etc.) and/or functionality as that of one or more synthetic system faults that can be generated in accordance with one or more embodiments of the subject disclosure. For example, the above described knowledge base and/or existing knowledge base that can be generated by aggregator component 204 can be used by, for instance, an operations management entity and/or an application support entity to discover one or more system faults in a certain system, where such one or more system faults can comprise the same attributes (e.g., discrete parameters, continuous parameters, etc.) and/or functionality as that of one or more synthetic system faults of the subject disclosure. For instance, the above described knowledge base(s) comprising one or more synthetic system faults that can be generated in accordance with one or more embodiments of the subject disclosure can enable such an operations management entity and/or application support entity to discover one or more unknown and/or previously undiscovered system faults in a certain system. In this example, the discovery of such one or more unknown and/or previously undiscovered system faults in a certain system using one or more synthetic system faults of the subject disclosure can thereby enable such an operations management entity and/or application support entity to prevent and/or mitigate the potential interruption of, malfunction of, and/or damage to one or more components of such a certain system.

It should also be appreciated that the above described knowledge base and/or existing knowledge base that can be generated by aggregator component 204 (e.g., using a knowledge base builder application or software) can be used to implement one or more tests on a certain system (e.g., fault detection test, stress test, performance test, load test, security test, etc.) using one or more synthetic system faults of such knowledge base(s) that can comprise the same attributes (e.g., discrete parameters, continuous parameters, etc.) and/or functionality as that of one or more system faults that can occur in such a certain system. For example, the above described knowledge base(s) comprising one or more synthetic system faults that can be generated in accordance with one or more embodiments of the subject disclosure can be used by, for instance, an operations management entity and/or application support entity to implement one or more tests on a certain system (e.g., fault detection test, stress test, performance test, load test, security test, etc.) using one or more synthetic system faults of such knowledge base(s) that can comprise the same attributes (e.g., discrete parameters, continuous parameters, etc.) and/or functionality as that of one or more system faults that can occur in such a certain system. In this example, testing a certain system using one or more synthetic system faults of the subject disclosure can thereby enable such an operations management entity and/or application support entity to prevent and/or mitigate the potential interruption of, malfunction of, and/or damage to one or more components of such a certain system.

Figure 3:
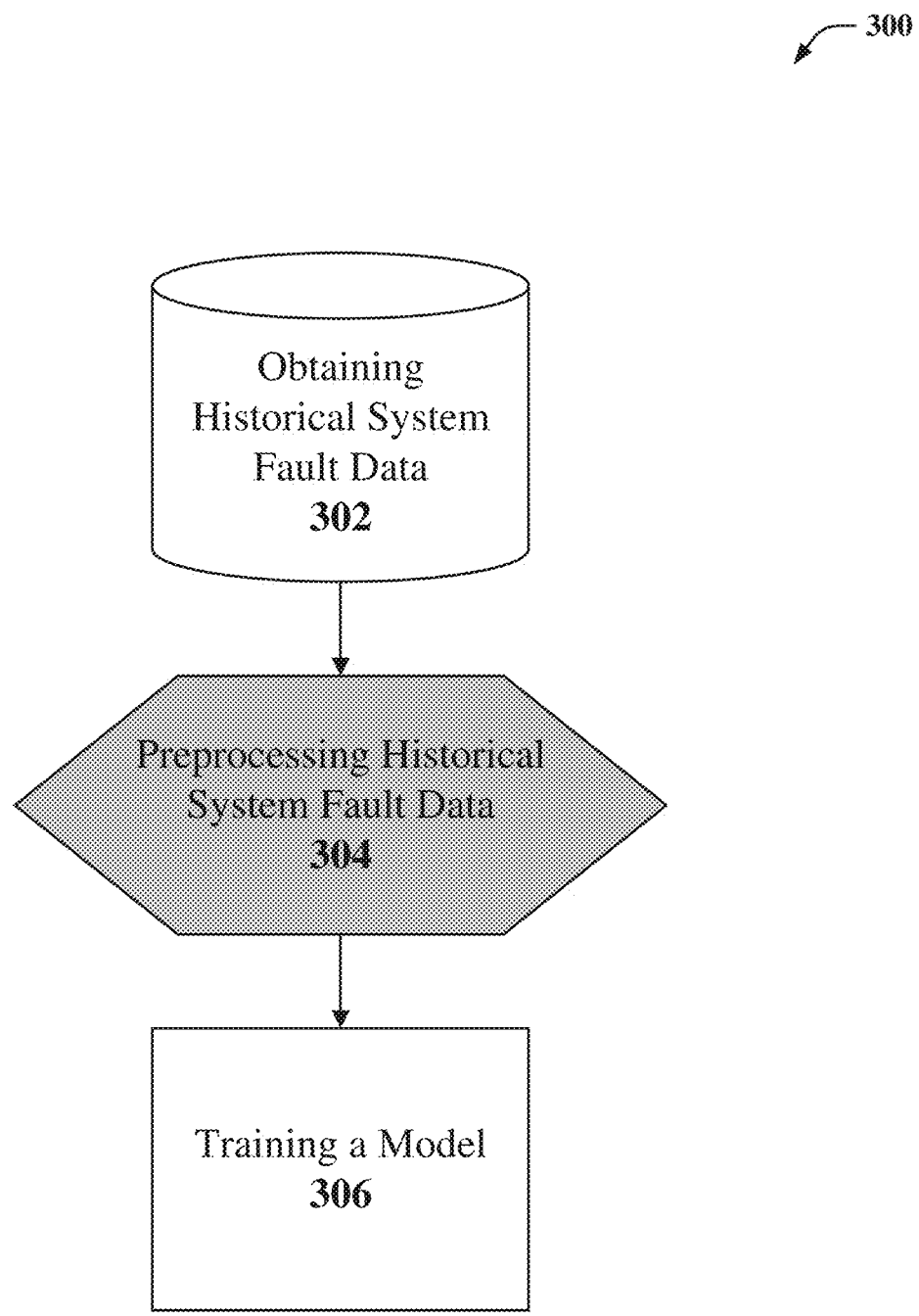
FIG. 3 illustrates a flow diagram of an example, non-limiting computer-implemented method that can facilitate synthetic system fault generation in accordance with one or more embodiments described herein.

FIG. 3 illustrates a flow diagram of an example, non-limiting computer-implemented method 300 that can facilitate synthetic system fault generation in accordance with one or more embodiments described herein. Repetitive description of like elements and/or processes employed in respective embodiments is omitted for sake of brevity.

At 302, computer-implemented method 300 can comprise obtaining (e.g., via synthetic fault generation system 102 and/or model trainer component 202), using a processor (e.g., processor 106), historical system fault data. For example, model trainer component 202 can use processor 106 to obtain historical system fault data that can be stored on a database such as, for instance, memory 104. In this example, such historical system fault data can comprise the historical system data defined above with reference to the example embodiment depicted in FIG. 2.

At 304, computer-implemented method 300 can comprise preprocessing (e.g., via synthetic fault generation system 102 and/or model trainer component 202), using a processor (e.g., processor 106), historical system fault data. For example, as described above with reference to the example embodiment illustrated in FIG. 2, model trainer component 202 can use processor 106 to preprocess such historical system fault data defined above that can be obtained at 302 as described above. For instance, model trainer component 202 can preprocess such historical system fault data defined above by representing historical discrete parameters as one-hot encoded vectors and using mode-specific normalization with Variational Gaussian Mixture Model to preprocess historical continuous parameters.

At 306, computer-implemented method 300 can comprise training (e.g., via synthetic fault generation system 102 and/or model trainer component 202), using a processor (e.g., processor 106), a model. For example, as described above with reference to the example embodiment illustrated in FIG. 2, model trainer component 202 can use processor 106 to train an AI model (e.g., a CTGAN) using the preprocessed historical system fault data that can be preprocessed at 304 as described above. For instance, as described above with reference to the example embodiments illustrated in FIGS. 1 and 2, model trainer component 202 can use such preprocessed historical system fault data to train an AI model (e.g., a CTGAN) to generate a synthetic system fault, represented as a combination of discrete parameters and continuous parameters that define a system state. In this example, as described above with reference to FIG. 2, model trainer component 202 can train an AI model (e.g., a CTGAN) with a Wasserstein Gradient Penalty Loss (WGAN-GP Loss).

Figure 4:
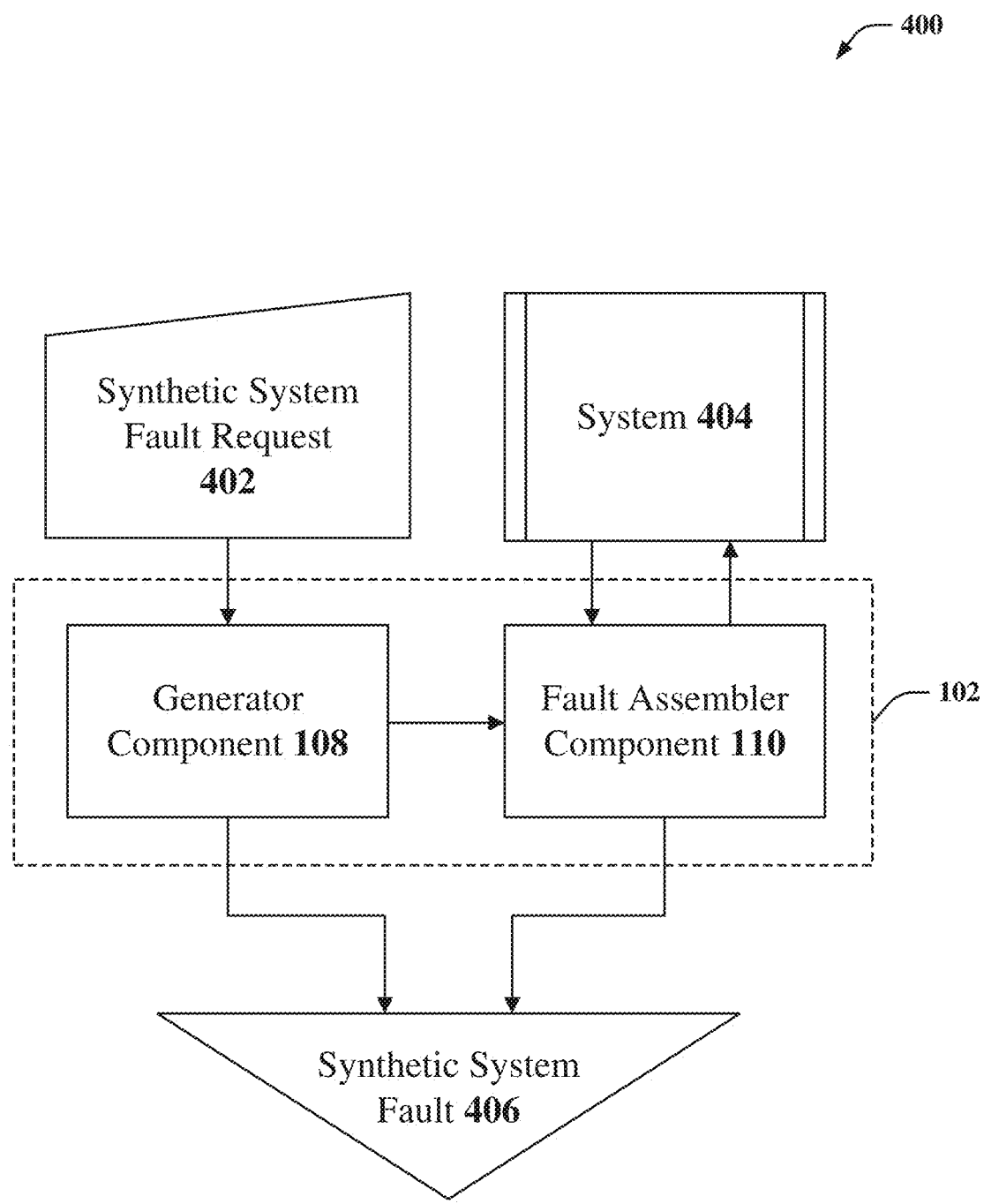
FIG. 4 illustrates a block diagram of an example, non-limiting system that can facilitate synthetic system fault generation in accordance with one or more embodiments described herein.

FIG. 4 illustrates a block diagram of an example, non-limiting system 400 that can facilitate synthetic system fault generation in accordance with one or more embodiments described herein. Repetitive description of like elements and/or processes employed in respective embodiments is omitted for sake of brevity.

As illustrated in the example embodiment depicted in FIG. 4, system 400 can comprise generator component 108 and/or fault assembler component 110 of synthetic fault generation system 102. In this example embodiment, synthetic fault generation system 102 and/or generator component 108 can receive a synthetic system fault request 402 to produce one or more synthetic system faults (e.g., N number of synthetic system faults). For example, in some embodiments, synthetic fault generation system 102 can comprise an interface component (not illustrated in the figures) including, but not limited to, an application programming interface (API), a representational state transfer (REST) API, a graphical user interface (GUI), and/or another interface component that can enable communication and/or data exchange between an entity as defined herein and synthetic fault generation system 102 and/or one or more components thereof. In this example, such an entity as defined herein (e.g., a human, a client, a user, a computing device, a software application, an agent, an ML model, an AI model, etc.) can submit a synthetic system fault request 402 to generator component 108 using such an interface component of synthetic fault generation system 102.

In the example embodiment depicted in FIG. 4, based on receiving a synthetic system fault request 402 as described above, generator component 108 can employ, for instance, a trained CTGAN to generate N number of synthetic system faults, where each of such N number of synthetic system faults are represented as a combination of at least one discrete parameter and at least one continuous parameter that define a system state. In this example embodiment, generator component 108 can provide each of such N number of generated synthetic system faults to fault assembler component 110. In this example embodiment, fault assembler component 110 can analyze each of such N number of synthetic system faults generated by generator component 108 to determine whether they are legitimate and/or meaningful system faults. For example, fault assembler component 110 can analyze each of such N number of synthetic system faults generated by generator component 108 to determine whether they are legitimate and/or meaningful system faults with respect to a certain system such as, for example, system 404.

In the example embodiment illustrated in FIG. 4, system 404 can comprise a software system and/or a hardware system (e.g., a classical computing software system and/or hardware system, a quantum computing software system and/or hardware system, etc.). In some embodiments, system 404 can serve as a representative system (e.g., a benchmark system) that fault assembler component 110 can use as a standard to analyze each of such N number of synthetic system faults generated by generator component 108 to determine whether they are legitimate and/or meaningful system faults with respect to such a representative system. In some embodiments, system 404 can comprise a certain system for which an ML and/or AI model (e.g., a CTGAN) can be trained to detect one or more system faults using as training data such N number of synthetic system faults that can be generated by generator component 108 as described above. In these embodiments, fault assembler component 110 can analyze each of such N number of synthetic system faults generated by generator component 108 to determine whether they are legitimate and/or meaningful system faults with respect to such a certain system.

To facilitate such analysis of the N number of synthetic system faults that can be generated by generator component 108 as described above, fault assembler component 110 can analyze each discrete parameter and each continuous parameter in each of such N number of synthetic system faults with respect to system 404. For example, fault assembler component 110 can evaluate data corresponding to system 404 and/or one or more components thereof (e.g., software components, hardware components, etc.) to determine whether each of such N number of synthetic system faults is a legitimate system fault (e.g., a logical system fault) and/or a meaningful system fault (e.g., a system fault that can actually occur) with respect to system 404 and/or one or more components thereof. In this example, such data corresponding to system 404 and/or one or more components thereof can include, but is not limited to, specifications, data sheets, protocols data, infrastructure data, functionality data, and/or other data corresponding to system 404 and/or one or more components thereof (e.g., software components, hardware components, etc.). In this example, fault assembler component 110 can evaluate such data corresponding to system 404 and/or one or more components thereof (e.g., software components, hardware components, etc.) to determine whether each of such N number of synthetic system faults is logical (e.g., does it make sense from a technical standpoint) and/or whether each of such N number of synthetic system faults can actually occur in system 404.

In the example embodiment depicted in FIG. 4, based on a determination by fault assembler component 110 that one or more of the N number of synthetic system faults that can be generated by generator component 108 is a legitimate system fault (e.g., a logical system fault) and/or a meaningful system fault (e.g., a system fault that can actually occur) with respect to system 404 and/or one or more components thereof, fault assembler component 110 can further generate textual content corresponding respectively to each of such one or more N number of synthetic system faults that fault assembler component 110 determines is a legitimate and/or meaningful system fault. For example, fault assembler component 110 can generate textual content such as, for instance, a system log and/or a textual description corresponding respectively to each of such one or more N number of synthetic system faults that fault assembler component 110 determines is a legitimate and/or meaningful system fault. In this example, such textual content corresponding to the synthetic system fault (e.g., a system log, a description of the synthetic system fault, etc.) can be formatted as a text file and/or another format that can be read by an entity as defined herein (e.g., a human, a client, a user, a computing device, a software application, an agent, an ML model, an AI model, etc.).

As illustrated in the example embodiment depicted in FIG. 4, the N number of synthetic system faults that can be generated by generator component 108 can be respectively combined with the corresponding textual content that can be generated by fault assembler component 110 to yield a synthetic system fault 406, thereby completing the synthetic system fault generation process that can be performed by synthetic fault generation system 102. In some embodiments, each synthetic system fault 406 can be provided to an entity as defined herein that implements synthetic fault generation system 102. For example, each synthetic system fault 406 can be provided to such an entity using an interface component of synthetic fault generation system 102 as described above (e.g., an API, a REST API, a GUI, etc.).

In some embodiments, each synthetic system fault 406 can be used (e.g., by aggregator component 204) to generate a knowledge base of various system faults (e.g., various synthetic system faults and/or authentic system faults). For example, each synthetic system fault 406 can be used by aggregator component 204 as described above with reference to the example embodiment illustrated in FIG. 2 to generate a knowledge base that can comprise various synthetic system faults and/or authentic system faults (e.g., system faults that have actually occurred and/or known system faults).

In some embodiments, each synthetic system fault 406 can be added (e.g., by aggregator component 204) to an existing knowledge base comprising various system faults (e.g., various synthetic system faults and/or authentic system faults). For example, aggregator component 204 can add each synthetic system fault 406 to an existing knowledge base that has been previously generated by aggregator component 204 as described above with reference to FIG. 2, where such an existing knowledge base can comprise various synthetic system faults and/or authentic system faults (e.g., system faults that have actually occurred and/or known system faults).

Figure 5:
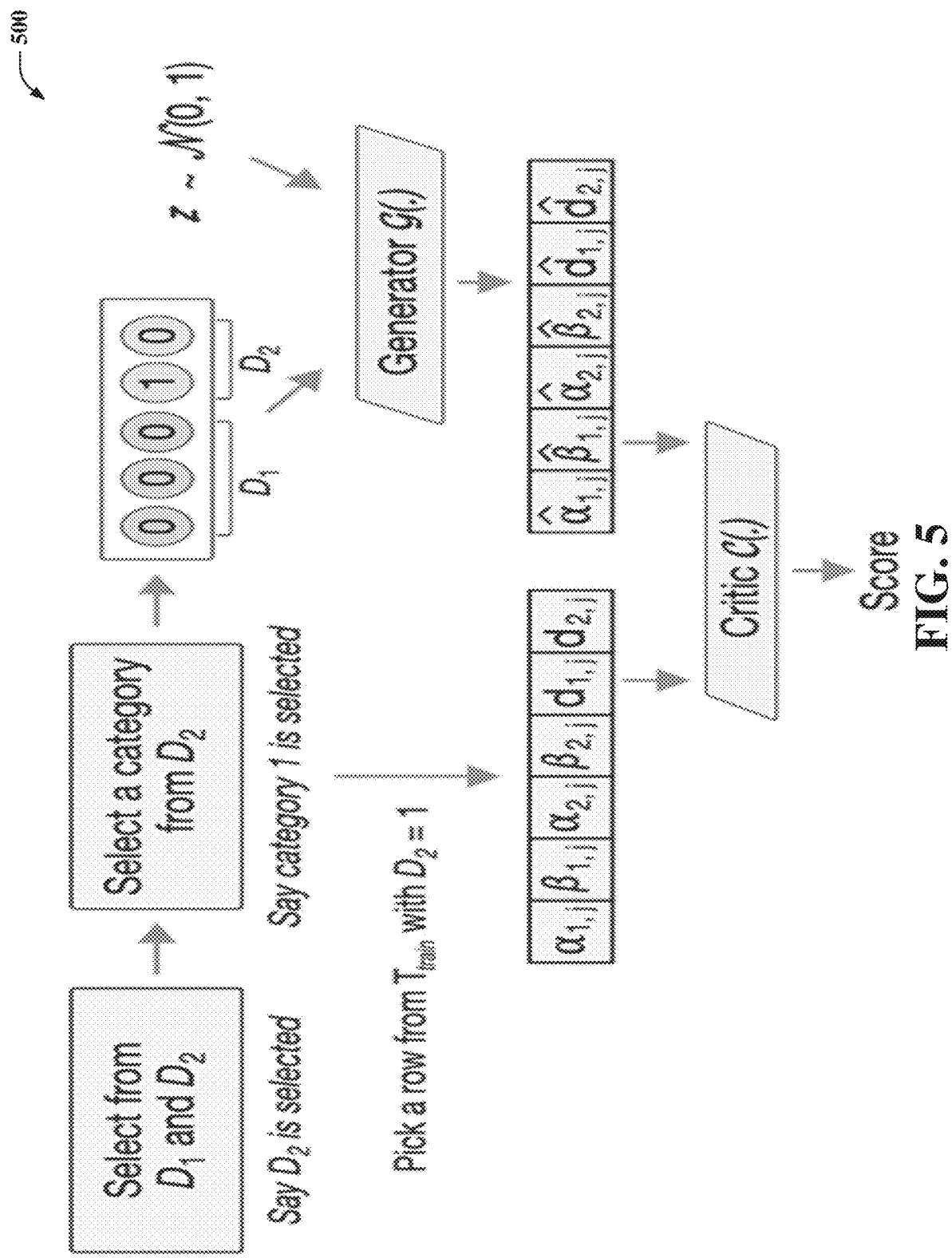
FIG. 5 illustrates an example, non-limiting diagram that can facilitate synthetic system fault generation in accordance with one or more embodiments described herein.

FIG. 5 illustrates an example, non-limiting diagram 500 that can facilitate synthetic system fault generation in accordance with one or more embodiments described herein. Repetitive description of like elements and/or processes employed in respective embodiments is omitted for sake of brevity.

Generator component 108 can restore complex multimodal distributions of a subset of at least one discrete parameter and/or at least one continuous parameter conditioned to a row of an associated dataset. Diagram 500 illustrates a block diagram depiction of an AI model process that can be performed (e.g., by a CTGAN employed by generator component 108) to facilitate such restoration described above. As illustrated by diagram 500, in an example, such an AI model process can utilize three fundamental elements: conditional vector, generator loss, and training by sampling. In this example, conditional vector can specify a selected category, generator loss can force a production of mask vectors, and training by sampling can enforce even sampling across discrete features.

In the example embodiment depicted in FIG. 5, the conditional generator (e.g., conditional vector) can generate synthetic rows conditioned on one of the discrete columns $D_1$ or $D_2$. As illustrated in the example embodiment depicted in FIG. 5, one of such discrete columns $D_1$ or $D_2$ is selected first (e.g., discrete column $D_2$ as illustrated in FIG. 5). In this example embodiment, based on such selection of one discrete column $D_1$ or $D_2$ (e.g., discrete column $D_2$ as illustrated in FIG. 5), one of the categories (e.g., category 1 as illustrated in FIG. 5) is selected from the selected discrete column $D_1$ or $D_2$. In this example embodiment, these elements (e.g., the selected discrete column $D_2$ and the selected category 1 illustrated in FIG. 5) identify the data that can be picked from a training dataset (e.g., choose a row that has the chosen column and the chosen category). In this example embodiment, the generator (e.g., conditional generator, conditional vector) is the conditional distribution of rows given that particular value at that particular column. In this example embodiment, the generator loss is used to penalize its loss (e.g., generator loss) by adding the cross-entropy averaged over all the instances of the batch. In this example embodiment, the output produced by the conditional generator (e.g., conditional vector) must be assessed by the Critic depicted in diagram 500 (e.g., a Critic Neural Network). In the example embodiment illustrated in FIG. 5, the Critic (e.g., a Critic Neural Network) estimates the distance between the learned conditional distribution of produced data and the conditional distribution on real data. In this example embodiment, the Critic (e.g., a Critic Neural Network) tunes itself online (e.g., during operation, at runtime) using the performance measure of the system (e.g., the score of the AI model).

Figure 6:
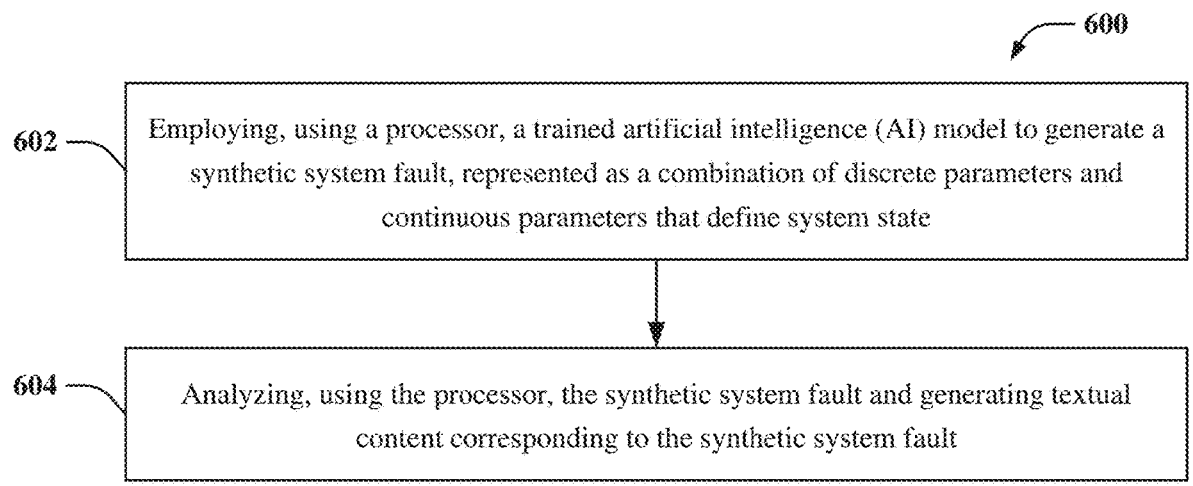
FIGS. 6 and 7 illustrate flow diagrams of example, non-limiting computer-implemented methods that can facilitate synthetic system fault generation in accordance with one or more embodiments described herein.

FIG. 6 illustrates a flow diagram of an example, non-limiting computer-implemented method 600 that can facilitate synthetic system fault generation in accordance with one or more embodiments described herein. Repetitive description of like elements and/or processes employed in respective embodiments is omitted for sake of brevity.

At 602, computer-implemented method 600 can comprise employing (e.g., via synthetic fault generation system 102 and/or generator component 108), using a processor (e.g., processor 106), a trained artificial intelligence (AI) model (e.g., a trained CTGAN) to generate a synthetic system fault (e.g., synthetic system fault 406), represented as a combination of discrete parameters and continuous parameters that define a system state (e.g., that together define the state of a system such as, for instance, a software system and/or a hardware system).

At 604, computer-implemented method 600 can comprise analyzing (e.g., via synthetic fault generation system 102 and/or fault assembler component 110), using the processor (e.g., processor 106), the synthetic system fault and generating (e.g., via synthetic fault generation system 102 and/or fault assembler component 110) textual content (e.g., a system log, a description of the synthetic system fault, etc.) corresponding to the synthetic system fault.

Figure 7:
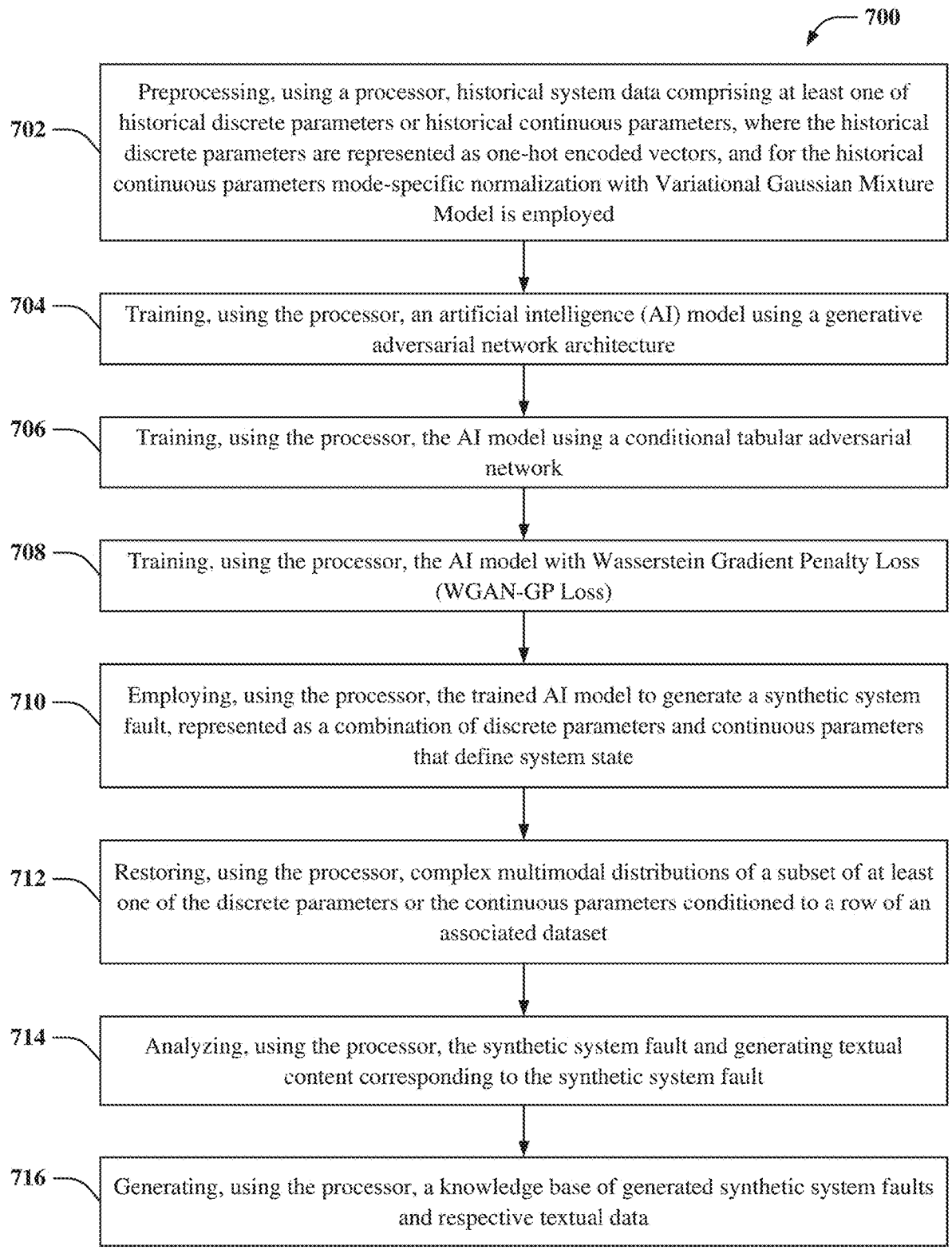

FIG. 7 illustrates a flow diagram of an example, non-limiting computer-implemented method 700 that can facilitate synthetic system fault generation in accordance with one or more embodiments described herein. Repetitive description of like elements and/or processes employed in respective embodiments is omitted for sake of brevity.

At 702, computer-implemented method 700 can comprise preprocessing (e.g., via synthetic fault generation system 102 and/or model trainer component 202), using a processor (e.g., processor 106), historical system data comprising at least one of historical discrete parameters or historical continuous parameters, where the historical discrete parameters are represented as one-hot encoded vectors, and for the historical continuous parameters mode-specific normalization with Variational Gaussian Mixture Model is employed (e.g., by model trainer component 202). For instance, such historical system fault data can include, but is not limited to: various combinations of historical discrete parameters and historical continuous parameters that define the state of a system, where each combination constitutes an authentic system fault that has occurred in a system; historical textual data (e.g., historical system logs, historical descriptions of authentic system faults, etc.) corresponding to authentic system faults that have occurred in one or more systems; historical fault localization data corresponding to one or more systems; historical root cause data corresponding to one or more systems; historical work order requests corresponding to one or more systems; historical information technology (IT) tickets corresponding to one or more systems; and/or other historical data that can constitute, define, describe, and/or correspond to one or more actual system faults that have occurred in a system.

At 704, computer-implemented method 700 can comprise training (e.g., via synthetic fault generation system 102 and/or model trainer component 202), using the processor (e.g., processor 106), an artificial intelligence (AI) model (e.g., a CTGAN) using a generative adversarial network architecture.

At 706, computer-implemented method 700 can comprise training (e.g., via synthetic fault generation system 102 and/or model trainer component 202), using the processor (e.g., processor 106), the AI model using a conditional tabular adversarial network.

At 708, computer-implemented method 700 can comprise training (e.g., via synthetic fault generation system 102 and/or model trainer component 202), using the processor (e.g., processor 106), the AI model with Wasserstein Gradient Penalty Loss (WGAN-GP Loss).

At 710, computer-implemented method 700 can comprise employing (e.g., via synthetic fault generation system 102 and/or generator component 108), using the processor (e.g., processor 106), the trained AI model (e.g., a trained CTGAN) to generate a synthetic system fault (e.g., synthetic system fault 406), represented as a combination of discrete parameters and continuous parameters that define a system state (e.g., that together define the state of a system such as, for instance, a software system and/or a hardware system).

At 712, computer-implemented method 700 can comprise restoring (e.g., via synthetic fault generation system 102 and/or generator component 108), using the processor (e.g., processor 106), complex multimodal distributions of a subset of at least one of the discrete parameters or the continuous parameters conditioned to a row of an associated dataset (e.g., where the columns of such a dataset comprise various discrete parameters and continuous parameters and each row of the dataset constitutes a system fault represented as a combination of at least one of such discrete parameters and at least one of such continuous parameters).

At 714, computer-implemented method 700 can comprise analyzing (e.g., via synthetic fault generation system 102 and/or fault assembler component 110), using the processor (e.g., processor 106), the synthetic system fault and generating (e.g., via synthetic fault generation system 102 and/or fault assembler component 110) textual content (e.g., a system log, a description of the synthetic system fault, etc.) corresponding to the synthetic system fault.

At 716, computer-implemented method 700 can comprise generating (e.g., via synthetic fault generation system 102 and/or aggregator component 204), using the processor (e.g., processor 106), a knowledge base of generated synthetic system faults and respective textual data.

Synthetic fault generation system 102 can be associated with various technologies. For example, synthetic fault generation system 102 can be associated with ML and/or AI model technologies, system fault detection technologies, automated system fault detection technologies, automated ML and/or AI model system fault detection technologies, cloud computing technologies, and/or other technologies.

Synthetic fault generation system 102 can provide technical improvements to systems, devices, components, operational steps, and/or processing steps associated with the various technologies identified above. For example, synthetic fault generation system 102 can generate a knowledge base comprising one or more synthetic system faults that can be used to discover one or more system faults in a certain system, where such one or more system faults can comprise the same attributes (e.g., discrete parameters, continuous parameters, etc.) and/or functionality as that of such one or more synthetic system faults in such a knowledge base. For instance, such a knowledge base comprising one or more synthetic system faults that can be generated by synthetic fault generation system 102 can enable an operations management entity and/or application support entity to discover one or more unknown and/or previously undiscovered system faults in a certain system. In these examples, the discovery of such one or more unknown and/or previously undiscovered system faults in a certain system using one or more synthetic system faults of the subject disclosure can thereby enable such an operations management entity and/or application support entity to prevent and/or mitigate the potential interruption of, malfunction of, and/or damage to one or more components of such a certain system.

Synthetic fault generation system 102 can provide technical improvements to a processing unit associated with synthetic fault generation system 102. For example, such one or more components of such a certain system described above can comprise a processor (e.g., a CPU, etc.). In this example, by generating the above described knowledge base that can be used to discover one or more system faults in such a certain system, synthetic fault generation system 102 can thereby prevent and/or mitigate the potential interruption of, malfunction of, and/or damage to such a processor of such a certain system.

A practical application of synthetic fault generation system 102 is that it can be implemented in an automated fault detection system to discover one or more system faults in a certain system, where such one or more system faults can comprise the same attributes (e.g., discrete parameters, continuous parameters, etc.) and/or functionality as that of one or more synthetic system faults that can be generated by synthetic fault generation system 102. For example, a practical application of synthetic fault generation system 102 is that it can be implemented in an automated fault detection system that utilizes one or more AI and/or ML models to discover one or more system faults in a certain system. In this example, synthetic fault generation system 102 can generate a substantial number of synthetic system faults having adequate quality that can be used as training data to train such one or more AI and/or ML models to automatically discover one or more authentic system faults in such a certain system.

It should be appreciated that synthetic fault generation system 102 provides a new approach driven by relatively new automated fault detection systems that utilize one or more ML and/or AI models to discover system faults. For example, synthetic fault generation system 102 provides a new approach to provide a substantial amount of quality training data to train such one or more ML and/or AI models to discover system faults. In another example, synthetic fault generation system 102 provides a new approach to provide synthetic system faults that can be used by, for instance, an operations management entity and/or an application support entity to discover one or more previously unknown and/or undiscovered system faults comprising the same attributes (e.g., discrete parameters, continuous parameters, etc.) and/or functionality as that of such one or more synthetic system faults.

Synthetic fault generation system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above.

synthetic fault generation system 102 and/or components thereof, can be employed to solve new problems that arise through advancements in technologies mentioned above, employment of quantum computing systems, cloud computing systems, computer architecture, and/or another technology.

It is to be appreciated that synthetic fault generation system 102 can utilize various combinations of electrical components, mechanical components, and circuitry that cannot be replicated in the mind of a human or performed by a human, as the various operations that can be executed by synthetic fault generation system 102 and/or components thereof as described herein are operations that are greater than the capability of a human mind. For instance, the amount of data processed, the speed of processing such data, or the types of data processed by synthetic fault generation system 102 over a certain period of time can be greater, faster, or different than the amount, speed, or data type that can be processed by a human mind over the same period of time.

According to several embodiments, synthetic fault generation system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that synthetic fault generation system 102 can include information that is impossible to obtain manually by an entity, such as a human user. For example, the type, amount, and/or variety of information included in synthetic fault generation system 102, generator component 108, fault assembler component 110, model trainer component 202, and/or aggregator component 204 can be more complex than information obtained manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
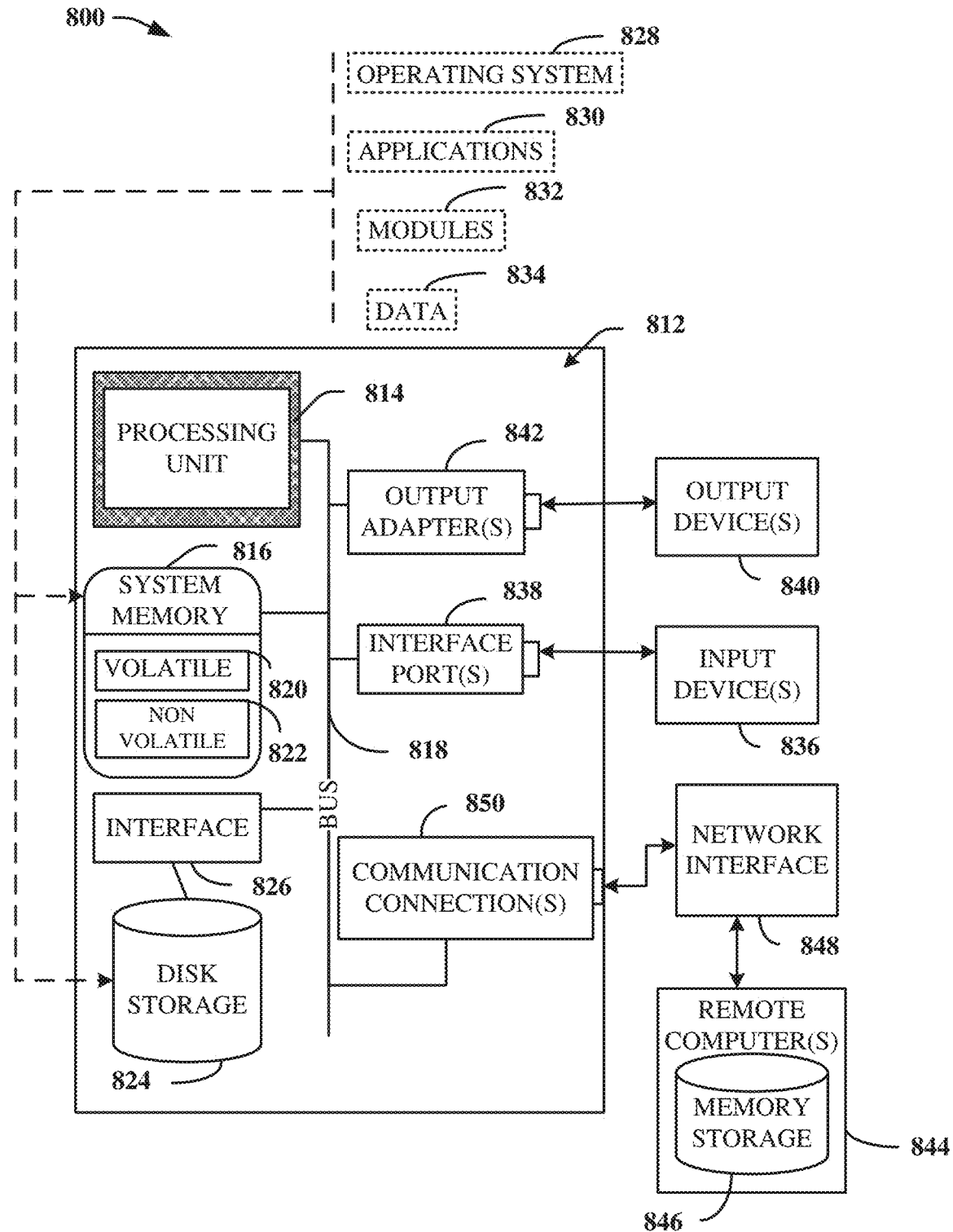
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
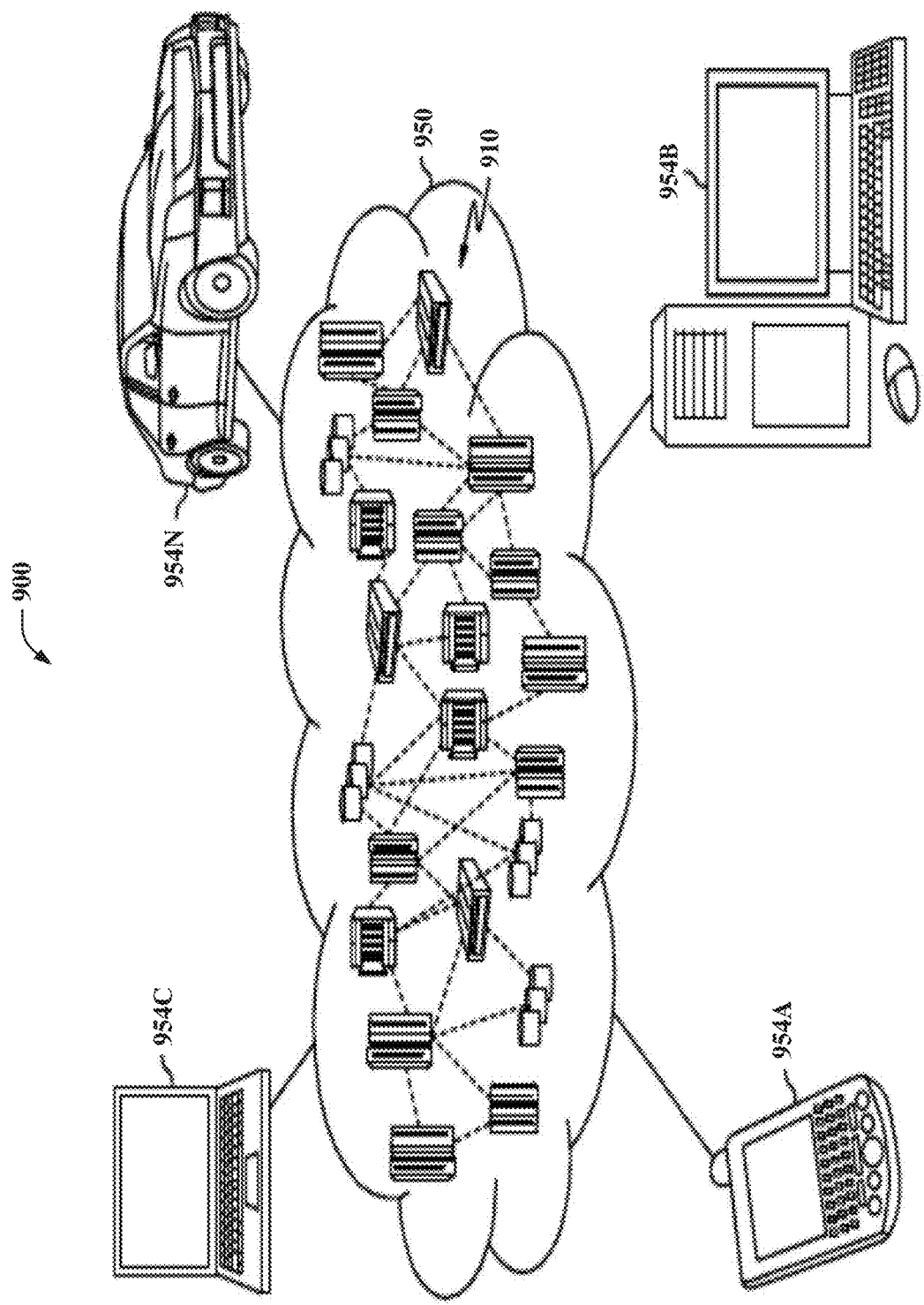
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
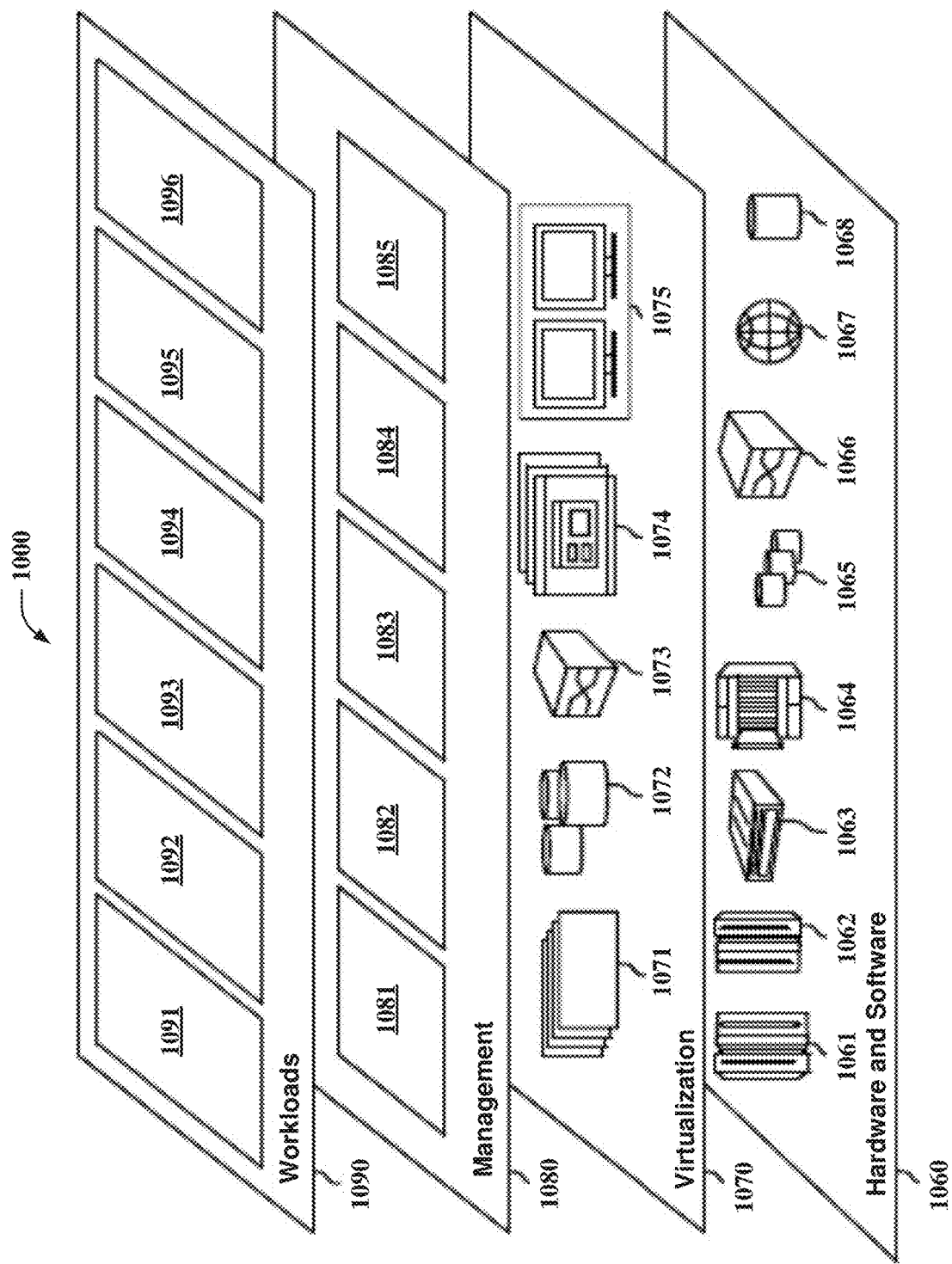
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and synthetic system fault generation software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer-executable components stored in the memory, wherein the computer executable components comprise:
        a generator component that employs a trained artificial intelligence (AI) model to generate a synthetic system fault, represented as a combination of discrete parameters and continuous parameters that define a system state, wherein the generator component restores complex multimodal distributions of a subset of at least one of the discrete parameters or the continuous parameters conditioned to a row of an associated dataset; and
        a fault assembler component that analyzes the synthetic system fault and generates textual content corresponding to the synthetic system fault.

2. The system of claim 1, further comprising a model trainer component that trains the AI model using a generative adversarial network architecture.

3. The system of claim 2, wherein the generative adversarial network architecture is a conditional tabular adversarial network.

4. The system of claim 2, wherein the model trainer component preprocesses historical system data comprising at least one of historical discrete parameters or historical continuous parameters, wherein the historical discrete parameters are represented as one-hot encoded vectors, and for the historical continuous parameters mode-specific normalization with Variational Gaussian Mixture Model is employed.

5. The system of claim 2, wherein the model trainer component trains the AI model with Wasserstein Gradient Penalty Loss (WGAN-GP Loss).

6. The system of claim 1, wherein the textual content comprises at least one of a system log or a description of the synthetic system fault.

7. The system of claim 1, wherein the computer-executable components further comprise an aggregator component that generates a knowledge base of generated synthetic system faults and respective textual data.

8. A computer-implemented method comprising:
    restoring, by a system operatively coupled to a processor, complex multimodal distributions of a subset of at least one of discrete parameters or continuous parameters conditioned to a row of an associated dataset;
    employing, by the system, a trained artificial intelligence (AI) model to generate a synthetic system fault, represented as a combination of the discrete parameters and the continuous parameters that define a system state; and
    analyzing, by the system, the synthetic system fault and generating textual content corresponding to the synthetic system fault.

9. The computer-implemented method of claim 8, further comprising training, by the system, the AI model using a generative adversarial network architecture.

10. The computer-implemented method of claim 8, further comprising training, by the system, the AI model using a conditional tabular adversarial network.

11. The computer-implemented method of claim 8, further comprising preprocessing, by the system, historical system data comprising at least one of historical discrete parameters or historical continuous parameters, wherein the historical discrete parameters are represented as one-hot encoded vectors, and for the historical continuous parameters mode-specific normalization with Variational Gaussian Mixture Model is employed.

12. The computer-implemented method of claim 8, further comprising training, by the system, the AI model with Wasserstein Gradient Penalty Loss (WGAN-GP Loss).

13. The computer-implemented method of claim 8, further comprising generating, by the system, a knowledge base of generated synthetic system faults and respective textual data.

14. The computer implemented method of claim 13, wherein the textual content comprises at least one of a system log or a description of the synthetic system fault.

15. A computer program product comprising a computer readable storage medium having program instructions embodied therewith, the program instructions executable by a processor to cause the processor to:
    restore complex multimodal distributions of a subset of at least one of discrete parameters or continuous parameters conditioned to a row of an associated dataset;
    employ a trained artificial-intelligence (AI) model to generate a synthetic system fault, represented as a combination of the discrete parameters and the continuous parameters that define a system state; and
    analyze the synthetic system fault and generate textual content corresponding to the synthetic system fault.

16. The computer program product of claim 15, the program instructions further executable by the processor to cause the processor to: train the AI model using a generative adversarial network architecture.

17. The computer program product of claim 15, the program instructions further executable by the processor to cause the processor to: train the AI model using a conditional tabular adversarial network.

18. The computer program product of claim 15, the program instructions further executable by the processor to cause the processor to: preprocess historical system data comprising at least one of historical discrete parameters or historical continuous parameters, wherein the historical discrete parameters are represented as one-hot encoded vectors, and for the historical continuous parameters mode-specific normalization with Variational Gaussian Mixture Model is employed.

19. The computer program product of claim 15, the program instructions further executable by the processor to cause the processor to: generate a knowledge base of generated synthetic system faults and respective textual data.

20. The computer program product of claim 15, wherein the training the AI model is based on a Wasserstein Gradient Penalty Loss (WGAN-GP Loss).

* * * * *